O. F. ZAHN.
ROLLER BEARING.
APPLICATION FILED MAR. 20, 1907.
977,692.
Patented Dec. 6, 1910.
2 SHEETS—SHEET 1.
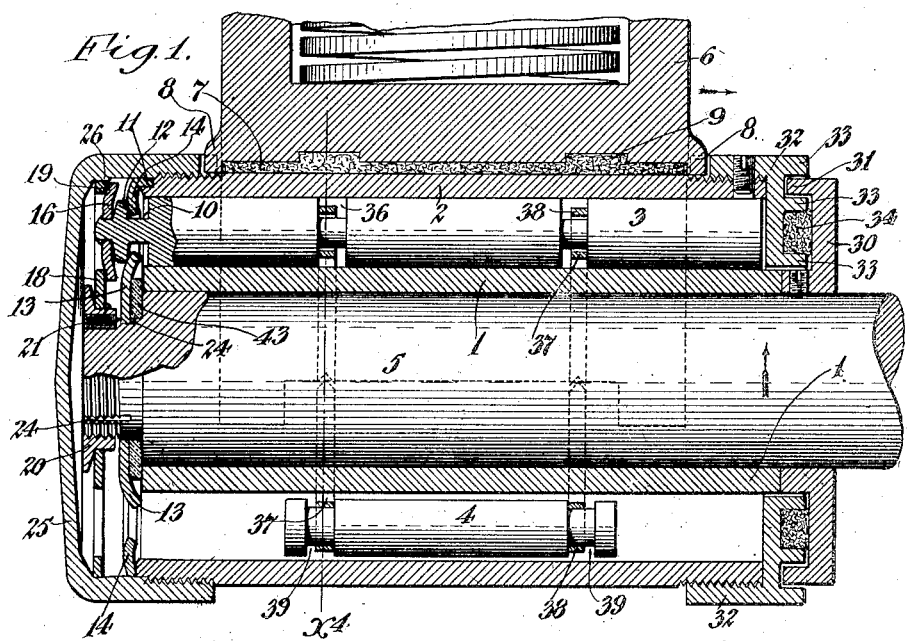
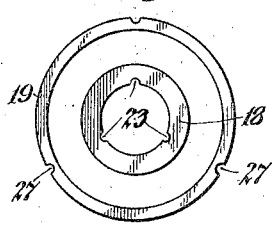
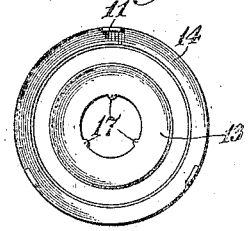
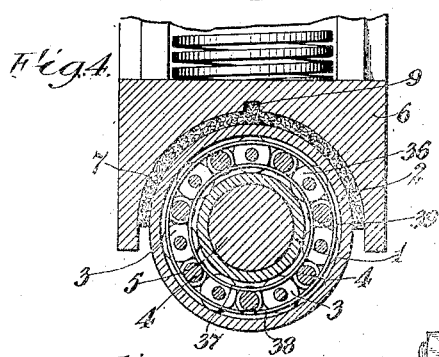
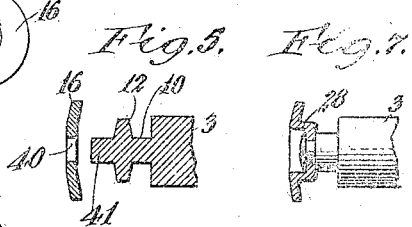
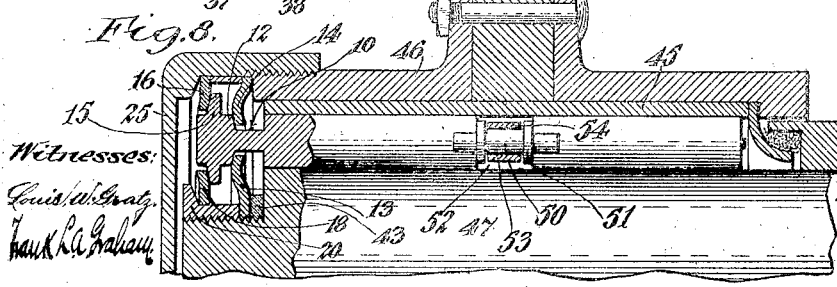
Inventor,
Oswald F. Zahn.
Witnesses:
By Townsend, Lyon, Huckley & Knight
his attorneys

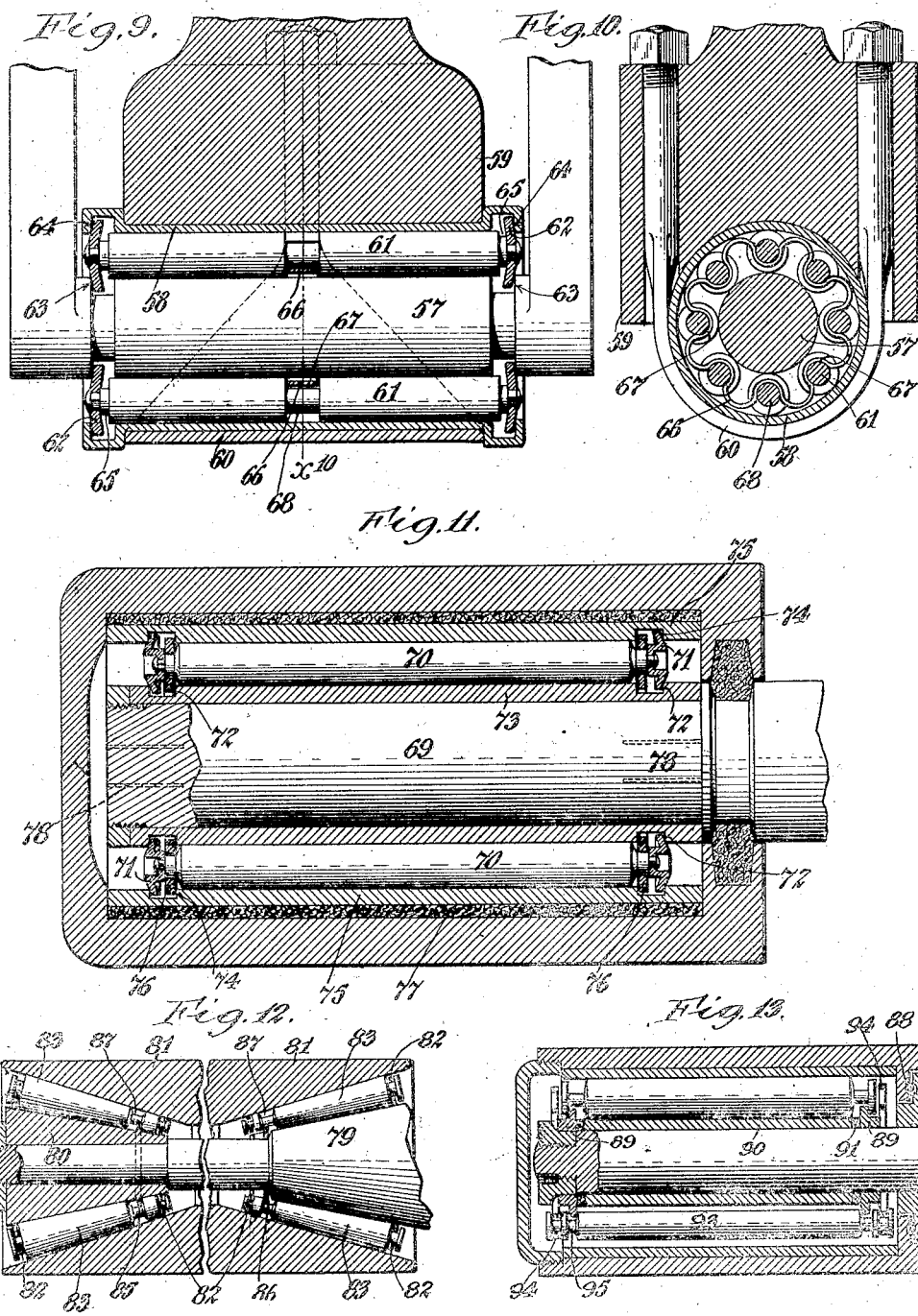

UNITED STATES PATENT OFFICE.

OSWALD F. ZAHN, OF LOS ANGELES, CALIFORNIA, ASSIGNOR TO ZAHN SELF RIGHTING ROLLER BEARING COMPANY, OF LOS ANGELES, CALIFORNIA, A CORPORATION OF CALIFORNIA.

ROLLER-BEARING.

977,692.	Specification of Letters Patent.	Patented Dec. 6, 1910.

Application filed March 20, 1907. Serial No. 363,519.

*To all whom it may concern:*

Be it known that I, OSWALD F. ZAHN, a citizen of the United States, residing at Los Angeles, in the county of Los Angeles and State of California, have invented a new and useful Improvement in Roller-Bearings, of which the following is a specification.

The main object of the present invention is to eliminate or reduce as far as possible the wear of the engaging parts of a roller bearing, particularly in the type of bearings wherein the rollers are maintained in proper position by the engagement of flanges and grooves on the bearing members and rollers. In such cases the wear comes principally at the corners or shoulders of the flanges and rollers, and the main object of the present invention is to provide means whereby the engagement at these portions will be to a certain extent of a yielding or elastic nature thereby practically eliminating the tendency to cut and grind such portions.

Another object of the invention is to provide a roller bearing wherein the parts will be so supported as to produce a certain amount of cushion effect for all of the strains produced therein.

The invention further relates to a roller bearing wherein the bearing rollers are maintained in proper position by positive deflecting forces brought into action on skewing of the rollers from such proper position, and an object of the invention in this connection is to provide a roller bearing of this character wherein such forces will be exerted substantially at one end of the roller, the necessary flanges and grooves being formed only at one end, thereby simplifying the construction of the rollers and bearings and facilitating the placing on or removal of the same from an axle.

Another object of the invention in connection with a self rectifying roller bearing is to utilize the spacing rollers thereof as a means of rectification.

Another object is to provide means at one end only of the rollers for taking the end thrust or longitudinal movement of the load sustaining rollers, and simultaneously therewith, taking the end thrust or relative longitudinal movement of both bearing members and at the same time producing a simple, self contained structure that can be easily slipped on or off of an axle.

In the accompanying drawings:—Figure 1 is a longitudinal section of a roller bearing embodying the invention, as adapted for a car axle bearing. In this figure some of the bearing rollers are omitted for clearness. Fig. 2 is an elevation of the rectifying abutment rib members in such roller bearing. Fig. 3 is an elevation of another set of rectifying abutment rib members in said bearing. Fig. 4 is a vertical section on line $x^4$ Fig. 1. Fig. 5 is a vertical detail section of an end portion of one of the bearing rollers and of a collar for attachment thereto. Fig. 6 is an end elevation of said collar. Fig. 7 is a sectional elevation of a different form of collar. Fig. 8 is a partial longitudinal section showing a different form of the roller bearing, adapted for a vehicle wheel. Fig. 9 is a longitudinal section of another form of roller bearing as applied to a crank pin. Fig. 10 is a transverse section on line $x^{10}$ in Fig. 9. Fig. 11 is a longitudinal section of another form of the roller bearing adapted for use where the outer bearing member is stationary. Fig. 12 is a longitudinal section of another form of the roller bearing, showing the broad scope of the invention. Fig. 13 is a longitudinal section of another form of the roller bearing in which ball bearings are used for taking end thrust.

Referring to Fig. 1, the inner bearing member 1 is represented as a sleeve on a shaft or axle, for example, a railroad axle journal 5, and the outer bearing member 2 is represented as a sleeve in a box or bearing 6 of said journal. The bearing rollers 3 and spacing rollers 4 are arranged in circular series between these bearing members. An elastic or cushion pad 7 is provided between the bearing member or cylinder 2 and box member 6 to give a uniform pressure on the sleeve and to moderate the effect of jar due to vibration or jolting of the bearings, said box having depressions 9 in which the pad extends to prevent turning and projections 8 which engage with the end caps to prevent their turning. The usual spring devices and pedestal means are provided in connection with the box for supporting the truck on the bearing, except that the guides on the sides are extended upward. The bearing rollers 3 are each grooved or reduced as at 10 to form the engaging wall 12 which must be of less diameter than the rolling diameter of the bearing roller and is preferably beveled or rounded. This groove receives the annular abutments 13, 14 respectively on the inner and outer bearing members, said abutments being adapted to engage by their outer faces, that is to say the faces which are directed away from the mid length of the rollers, against the wall of the groove which is farthest from mid length of roller or wall 12. The groove 10 in the bearing roller is sufficiently wide to prevent engagement of the other wall or face of said groove with the said annular members 13, 14, means being provided to retain the bearing rollers from moving longitudinally outward to avoid such engagement. Such means are here shown as consisting of an enlarged roller rib or collar 16 on the end of each bearing roller adapted to rotate with the roller and to engage by its outwardly directed face the inwardly directed faces of two annular abutments 18, 19, respectively on the inner and outer bearing members. It is desirable that the largest diameter of the abutment 18 on the inner bearing member be slightly less than that of the bearing surface of the inner bearing member and that the smallest diameter of the abutment 19 be of slightly larger diameter than the diameter of the bearing surface of the outer bearing member so that rectifying results will be assured. It is also desirable that the edges of both grooves and ribs be rounded to some degree.

Abutment 14 is held from rotating by means of keys or projections 11 engaging notches in the sleeve 2, and the abutment 13 is secured by means of projections 17 which enter in slots 24 in the journal member 1. The abutment 18 is carried by a bur 20 screwing on the end of journal 5 and secured by set screw 21, said bur having a beveled side embracing the abutment 18, the latter having notches 23 engaging with projections on the bur to prevent rotating. The abutment 19 is carried by a cap member 25 screwing on the end of the outer bearing member 2, said abutment entering within the said cap and being held in place by projections 26 which engage in notches 27 in said abutment. This construction closes the outer end of the bearing. The inner end of the bearing may be closed by gasket means consisting of a radial flange 30 on the inner bearing member and having an annular projection 31, and the outer bearing member having a screw cap 32 with projections 33, between two of which and the flange 30 is inclosed a suitable packing 34.

The bearing rollers 3 are grooved as at 36 to permit passage of inner and outer floating retaining rings 37 and 38 that hold spacing rollers, said spacing rollers being grooved as at 39 to receive the said retaining rings. Said grooves 36 and 39 are so located that the retaining rings bear against the inwardly facing walls of the grooves in the bearing rollers and against the outwardly facing walls of the grooves in the spacing rollers.

To explain the mode of operation in Fig. 1, imagine the outer bearing member 2 stationary and inner bearing member 1 revolving in the direction of the arrow. The bearing rollers will then be revolving within and in contact with the outer bearing member in the same direction as arrow, but will be rolling backward, as it were, on the inner bearing member. Imagine a roller skewing, the left hand end leading, as related to the outer bearing member. The roller will then in its further movement drift toward the right hand end and the wall of groove at 12 will engage with the abutment 14 on outer bearing member, and the friction developed will retard that end. But suppose the roller is skewed in just the opposite way, and the left hand end is lagging. The roller will then in its further movement drift toward the left and the enlarged roller rib 16 will engage with the abutment 19 on the outer bearing member. The point of contact is on a part of the roller rib that is of larger diameter than the diameter of the bearing surface of the roller and is thus going at a greater speed. Such a contact will pull the end of the roller forward until the roller is once more restored to a correct position. Thus the groove means 10 corrects a roller when it drifts in one direction and the rib means 16 corrects the roller when it drifts in the other direction. By having interengaging portions on both bearing members as shown, the rollers will receive twice the rectifying effects, and in addition become a means to take the end thrust of the bearing member, or rather will transmit the end thrust to the rolling surface of the bearing roller. To describe this action suppose there is an end pressure on the outer bearing member pushing it toward the right as per arrow so as to engage the end of the rollers. The engagement will then be between abutment 19 and roller rib 16. If the end pressure is great enough, then the rollers will in turn be pushed in the same direction until the inwardly facing wall at 12 engages the inner bearing member abutment 13. The former roller engagement will cause the left hand end of the roller to lead so that in its further movement it will drift toward the right hand, thus releasing the pressure on the rib. The latter roller engagement causes the left hand end of the roller to lag as related to the inner bearing member, but to go forward as related to the outer bearing member, so that the rollers are from two sources skewed temporarily into a favorable position that will in their further movement carry the outer bearing member toward the end pressure, thus automatically counteracting the end pressure of the bearing members and at the same time releasing all heavy strains on the interengaging portions. The end play of the rollers, the end thrust of the bearing members, and all wear on the longitudinal engagements on the rollers can be easily adjusted by turning the bur 20 and the cap 25 to a suitable point. In this figure the spacing rollers operate at the same time to aid in the rectifying effect. As the spacing rollers rotate oppositely to the bearing rollers, their exterior retaining rings 38, as they are moved circumferentially around in the grooves of the bearing and spacing rollers respectively will drift or be moved laterally by the engagement therewith of the bottom of the grooves 39 of the spacing rollers in a direction opposite to the drift of the bearing roller so that when, for example, the left hand end of the bearing rollers are in advance and thus drifting toward the right, then the left hand retaining ring 38 is pinched between the inner wall of the spacing roller groove and the outer wall of the bearing roller groove, thus retarding that end of the roller. This rectification takes place principally on the loose side of the bearing.

The roller rib 16 is preferably formed of a separate piece of metal having a non-circular hole 40 to be slipped over the end of the stud 41, on the bearing roller, and the end of said stud being upset or riveted to hold it in place. The adjacent portion of the annular flange 12 on the bearing roller is inclined or beveled to enable the rib to yield inwardly under the pressure of the abutments 18, 19. Said abutments are also made of thin material, for example, spring steel, and have yielding capacity, and the same is true of the annular abutments 13, 14 engaging with the inwardly facing wall of the bearing roller groove so that there is no possibility of sharp cutting or abrasive contact between the rectifying portions. Any sudden endwise strain or shock is taken up smoothly and does not interfere with the proper operation. The abutments can be convex or rounded in shape, as shown, to provide more effective elasticity. A cushion 43 of felt or other elastic material is interposed between the abutment 13 and the inner bearing member to aid in this yielding action and to adjust the longitudinal position of the bearing. Said abutment 13 floats or is movable longitudinally between the bur 20 and this cushion. Elasticity of the roller rib may be attained by forming it as an extension from the shoulder member 12, both of these members being formed in one piece as shown at 28 in Fig. 7.

Fig. 8 shows the application of the invention to a vehicle wheel bearing wherein the outer bearing member 45 is formed as a sleeve in a wheel hub 46, and the inner bearing member is a spindle 47.

The construction as to the rectifying devices is as shown in Fig. 1, except that instead of separate shoulder and rib members on the bearing roller, the shoulder 12 and roller rib 15 are formed integral with the roller by turning up an enlargement on the end of the bearing roller or by hammering. Spacing means may also be modified, as shown in this figure, consisting, for example, of a short roller 50 having end portions running on the bearing roller and having annular flanges 51 running within the central groove 52 on the bearing roller, the inner and outer retaining rings 53, 54 running between these annular flanges. In this case the abutment member 13 is clamped between the bur 20 and the cushion 43.

In each of the forms shown in Figs. 1 and 8, the ribs and the abutment engaging wall of the grooves are between the abutments, so that only that wall of the groove and that wall of the rib which are farthest from the midlength of the roller are adapted to engage with said abutments, this being desirable for the rectifying operation.

Figs. 9 and 10 show the application of the invention to a crank or wrist pin bearing, 57 designating the inner bearing member or wrist pin, and 58 designates the outer bearing member formed as a sleeve or cylinder held in place on the cross head 59 by a yoke member 60. The bearing rollers 61 rolling between said bearing members are provided with rib portions 62, preferably elastic, of greater diameter than the rollers. In this case the abutment means 63 is shown as formed directly on the inner bearing member and rotating therewith, and abutment means 64 as formed at the end of a sleeve so as to become elastic. The bearing rollers are grooved or recessed at 65 to permit inward deflection of said roller ribs. As shown in these figures spacing rollers may be dispensed with and any suitable means used, for example, a band 66 bent in sinuous form to provide seats or depressions 67 receiving and engaging necks 68 of the bearing rollers. In this form of bearing rollers rectification is attained solely by the contact between the inner and outer bearing member abutments 63, 64 and the outwardly facing walls of the roller ribs 62.

Fig. 11 shows a bearing wherein the rectification is similar to Fig. 9, the bearing rollers 70 having ribs 71 engaging with abutments 72 on the inner bearing member 73 formed as a sleeve on a journal 69 and with abutments 74 on the outer bearing member 75, this figure showing the application of a rib member 71 formed as in Fig. 7 to provide the necessary elasticity. The spacing means shown in this figure consists of a flat ring 76 at each end of the bearing in which the bearing rollers 70 are journaled. This bearing is assembled by slitting a portion of the sleeve, as indicated in dotted lines at 78, and bending it back thus allowing a space to permit the entering of the roller ribs before being riveted to the rollers. In this figure an elastic pad 77 is shown surrounding the outer bearing sleeve.

Fig. 12 shows a form of the invention wherein only one groove near one end of the bearing roller is needed for rectification. The bearing rollers are held in position for engaging therewith by bearing pressure, the rollers being in this case conical so that the bearing pressure serves to force the same outwardly, that is, in the direction toward the larger end of the roller. 79, 80 designates the double conical inner bearing member and 81 the double conical outer bearing member, the bearing rollers 83 running between said bearing members and being spaced apart by collars 82 in which the ends of the bearing rollers 83 are journaled. On the inner bearing member are provided annular abutment members 85 and 86 extending into grooved portions 87 of the bearing rollers and engaging with the walls of such grooves which are farthest from mid length of the rollers, the outward pressure above referred to on the bearing members being the means of holding them in position to insure such engagement. Bearing abutment member 86 is shown as an elastic floating rib.

Fig. 13 shows a form of the invention in which a set of ball bearings 88 takes the end thrust of the bearing members. Similar end thrust devices can be applied to the various forms illustrated for bearings where the end thrust is heavy and continual. In this figure is shown a form of the invention wherein the annular rib 89 on the inner bearing member 90 is itself rigid, but is supported by elastic means 91 in the form of a collar or washer of elastic material such as felt, rubber or leather between it and the end of the inner bearing sleeve 90, thereby attaining the effects of elastic contact. This figure also shows the rectifying use of the spacing rollers 93 which extend beyond the bearing rollers to receive spacing rings 94. The ribs 89 are here used as the means for the longitudinal retainers of the spacing rollers 93, the grooves 95 straddling said ribs 89 and the walls of grooves nearest mid length of spacing rollers engaging longitudinally with said ribs, while the other walls of grooves are free from engagement. The ribs 89 have no notches to prevent rotating and are also free to move longitudinally outward, but their inward movement as well as rotating movement is limited by contacting with the elastic means 91.

Certain features of the device herein ···med relating to the rectifying means are disclosed in application No. 449,155, filed Aug. 18, 1908, which are not therein claimed, said disclosure having been transferred to said application from my prior application No. 332,294, filed Aug. 27, 1906.

What I claim is:—

1. A roller bearing comprising bearing members and bearing rollers, the bearing rollers and one of the bearing members having interengaging ribs and abutments, said ribs being elastic.

2. In a roller bearing, rollers having elastic ribs at one end, and means for engaging with said ribs to cause said ends to each advance or be retarded relatively to the other end.

3. A roller bearing comprising bearing members, rollers, and abutments in connection with the bearing members and engaged by the rollers to take the end thrust, said abutments being elastic.

4. A roller bearing comprising bearing members and bearing rollers, one of the bearing members and the bearing rollers having interengaging ribs and abutments, said ribs being elastic, and having a clearance on the side away from the pressure receiving side to allow yielding thereof.

5. A roller bearing comprising bearing members and bearing rollers, said bearing rollers and one of said bearing members having interengaging abutments and ribs, and longitudinally yielding supporting means for one of said abutments.

6. A roller bearing comprising inner and outer bearing members and bearing rollers therebetween, each roller having a groove near one end, an abutment on the inner bearing member in position for engaging with one of the walls of each of said grooves, said abutment being free to move longitudinally outward from the mid length of the roller, and means for limiting the inward movement thereof.

7. In a roller bearing, the combination of inner and outer bearing members with bearing rollers, of a floating abutment longitudinally movable on a bearing member, means for limiting the inward movement of said abutment, and means for preventing rotation of said abutment on the bearing member which supports it.

8. In a roller bearing, the combination of inner and outer bearing members, bearing rollers and spacing rollers, and an annular retainer, said spacing rollers being grooved to receive said retainer, the walls of said grooves nearest the mid length of said rollers engaging said retainer, and means for holding the retainer free from engagement with the other wall, and the bearing rollers having grooves to receive said retainer and engaging therewith by the wall of the grooves farthest from the mid length of the roller.

9. A roller bearing comprising inner and outer bearing members, rollers between said members, abutments on the bearing members and ribs on the rollers engaging said abutments to take end thrust, said ribs being elastic.

10. A roller bearing comprising inner and outer bearing members, rollers between said members, abutments on the bearing members and ribs on the rollers engaging said abutments to take end thrust, said abutments comprising yielding elastic portions to elastically resist the end thrust.

11. A roller bearing comprising inner and outer bearing members, rollers between said members, abutments on the bearing members and ribs on said rollers engaging said abutments to take end thrust, said abutments and ribs being elastic.

In testimony whereof, I have hereunto set my hand at Los Angeles, California, this 11th day of March 1907.

OSWALD F. ZAHN.

In presence of—
ARTHUR P. KNIGHT,
FRANK L. A. GRAHAM.